United States Patent
Petry et al.

[11] Patent Number: 6,151,513
[45] Date of Patent: Nov. 21, 2000

[54] AERIAL FOR A CENTRAL STATION OF A POINT-TO-MULTI-POINT RADIO LINK SYSTEM

[75] Inventors: Hans-Peter Petry, Sulzbach-Laufen; Heinz Göckler; Harald Ansorge, both of Backnang; Erich Auer, Besigheim, all of Germany

[73] Assignee: Robert Bosch GmbH, Stuttgart, Germany

[21] Appl. No.: 09/043,279

[22] PCT Filed: Jun. 29, 1996

[86] PCT No.: PCT/DE96/01160

§ 371 Date: Mar. 13, 1998

§ 102(e) Date: Mar. 13, 1998

[87] PCT Pub. No.: WO97/11508

PCT Pub. Date: Mar. 27, 1997

[30] Foreign Application Priority Data

Sep. 23, 1995 [DE] Germany .......................... 195 35 441

[51] Int. Cl.[7] .......................... H01Q 3/22; H01Q 21/00; H04B 1/06
[52] U.S. Cl. .......................... 455/562; 455/269; 343/853; 342/373
[58] Field of Search .......................... 455/41, 129, 269, 455/562, 422, 13.3, 25; 343/853; 342/373, 374

[56] References Cited

U.S. PATENT DOCUMENTS

| 5,576,717 | 11/1996 | Searle et al. ............................ 342/373 |
| 5,596,329 | 1/1997 | Searle et al. ............................ 342/374 |
| 5,602,555 | 2/1997 | Searle et al. ............................ 342/374 |
| 5,603,089 | 2/1997 | Searle et al. ............................ 455/53.1 |
| 5,809,431 | 3/1999 | Bustamante et al. ................... 455/562 |
| 5,878,327 | 3/1999 | Hayashi et al. ........................... 455/41 |
| 5,966,641 | 10/1999 | Flowerdew ............................... 455/41 |

FOREIGN PATENT DOCUMENTS

| 0 593 822 | 4/1994 | European Pat. Off. . |
| 0 627 828 | 12/1994 | European Pat. Off. . |
| 0 660 630 | 6/1995 | European Pat. Off. . |
| 0 715 478 | 6/1996 | European Pat. Off. . |
| 34 20 917 | 12/1985 | Germany . |
| 41 34 357 | 4/1993 | Germany . |
| 43 18 108 | 1/1995 | Germany . |
| 2 271 246 | 4/1994 | United Kingdom . |
| WO93/12590 | 6/1993 | WIPO . |

Primary Examiner—Fan Tsang
Assistant Examiner—Sheila Smith
Attorney, Agent, or Firm—Kenyon & Kenyon

[57] ABSTRACT

To enable the antenna of a central station of a point-to-multipoint radio relay system to be operated with as little transmitting power as possible and to assure high transmission quality, the antenna produces a characteristic composed of a plurality of sectors which are so designed with regard to their direction and their opening angle that each individual sector is restricted as narrowly as possible to the area occupied by one or a plurality of subscriber stations.

13 Claims, 1 Drawing Sheet

AERIAL FOR A CENTRAL STATION OF A POINT-TO-MULTI-POINT RADIO LINK SYSTEM

FIELD OF THE INVENTION

The present invention relates to an antenna of a central station of a point-to-multipoint radio relay system. The antenna communicates with a plurality of surrounding subscriber stations, equipped with directional antennas, and produces a sectored characteristic.

BACKGROUND INFORMATION

German Patent No. 3420917A1 describes a point-to-multipoint radio relay system. The German Patent mentioned that the central station possesses an antenna having either an omnidirectional characteristic, or a sector characteristic. To produce an omnidirectional characteristic which covers the entire area surrounding the central station, it is possible to work with a single antenna (dipole). Alternatively to that, the area surrounding the central station can be divided into individual sectors, a separate antenna being responsible for the illumination of each sector. These conventional antenna arrangements require a high transmitting power, both from the central station and the subscriber stations.

SUMMARY OF THE INVENTION

An object of the present invention is to provide an antenna of a central station of a point-to-multipoint radio relay system which requires as low a transmitting power as possible, both on the part of the central station and the subscriber stations, and assures as high a transmission quality as possible.

Because, according to the present invention, the antenna characteristic of the central station is subdivided into sectors which are strictly limited to the surrounding subscriber stations, both the central stations and the subscriber stations get along with a relatively low transmitting power, and high transmission quality is assured in both transmission directions between the fixed station and the subscriber stations. Interference from other radio-communication systems not belonging to the point-to-multipoint radio relay system is kept low due to the concentration of the transmission characteristic of the central station. In this manner, the electromagnetic environmental compatibility (EMUV) is also improved. Due to the concentration of the reception characteristic of the central station on the existing subscriber stations, they need only a relatively low transmitting power to assure good transmission quality from the subscriber stations to the fixed station. Thus, interference in the point-to multipoint radio relay system by other radio-communication systems is largely ruled out. A particularly strong concentration of the antenna characteristic of the central station on the subscriber stations is achieved, in that the antenna of the central station forms transmission lobes and/or reception lobes in the sectors occupied by individual or a plurality of subscriber stations. Advantageously, sectors and lobes, respectively, which are locally separate from one another, are operated in the same channel, i.e. on the same frequency, in the same time slot or in the same code. It is also advantageous if the antenna of the central station aligns a transmission or reception lobe to a subscriber station only if a communication link is to be produced between the two, and removes the directivity characteristic again after the link has terminated. Here, it is expedient to provide a signaling channel between all subscriber stations and the central station which contains information as to for which subscriber stations radio links are to be set up and disconnected, respectively. Such a signaling channel could be transmitted via an omnidirectional characteristic.

DETAILED DESCRIPTION OF THE INVENTION

Figure 1:
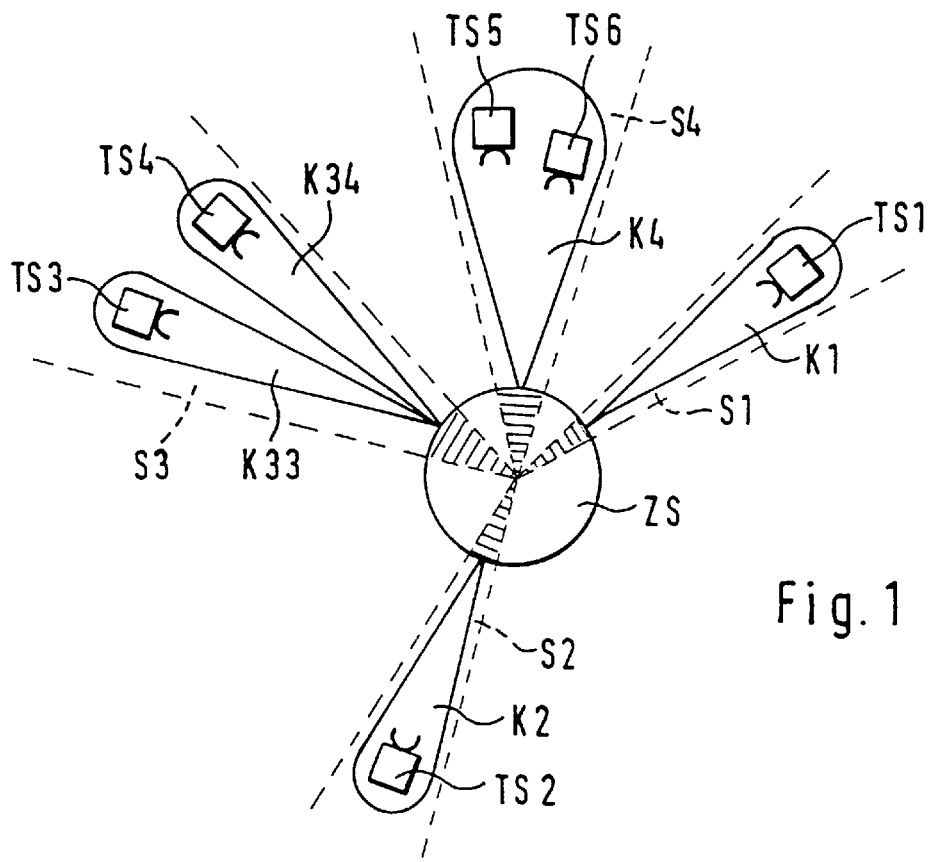
FIG. 1 shows a schematic representation of a point-to-multipoint radio relay system according to the present invention.

In the point-to-multipoint radio relay system shown in FIG. 1, six subscriber stations TS1 ... TS6, for example, are arranged around a central station ZS. The distances between the individual subscriber stations TS1 ... TS6 are very variable. An antenna present in central station ZS forms a sectored characteristic which is preferably utilized both for sending out communications to subscriber stations TS1 ... TS6, and for receiving communications sent out by subscriber stations TS1 ... TS6 to central station ZS. The individual sectors S1 ... S4, indicated by shading in FIG. 1, are narrowly restricted to the regions in which subscriber stations TS1 ... TS6 lie. Sectors S1 ... S6 of the antenna characteristic are limited as narrowly as possible to the regions in which one or even a plurality of subscriber stations TS1 ... TS6 lie. In this context, sectoral regions in which no subscriber stations are located are left out of the antenna characteristic. Consequently, the power emitted from the antenna is concentrated as narrowly as possible on existing subscriber stations TS1 ... TS6. This brings a savings in transmitting power, and almost no spurious emission is produced for other radio-communication systems. If several subscriber stations TS3, TS4 and TS5, TS6, respectively, lie very close next to one another, it is advisable to allocate them to one sector S3 and S4, respectively, of the antenna characteristic.

A crosstalk between adjacent sectors and the antenna characteristic can be reduced, because their fields are orthogonally polarized relative to each other.

The best transmission quality (sending and receiving) between central station ZS and individual subscriber stations TS1 ... TS6 is attained because the sectors of the antenna characteristic have the shape of a lobe K1, K2, K4, or even a plurality of lobes K33 and K34. As FIG. 1 shows, there are now several variants for the allocation of the lobes to the individual subscriber stations. Thus, a sector S1 and S2, respectively, can be comprised of a lobe K1 and K2, respectively, which is aligned to a single subscriber station TS1 and TS2, respectively. In another case, the antenna forms two lobes K33 and K34 in one sector S3, one lobe K33, K34 being aligned in each case to one subscriber station TS3, TS4. To avoid crosstalk between the two lobes K33 and K34, in the case of subscriber station TS4, the antenna produces an attenuation pole for the lobe aligned to subscriber station TS3, and conversely. Two or more subscriber stations TS5, TS6 can also be included by one lobe K4 in one sector S4.

Along the lines of the power savings, it is advantageous if the antenna of central station ZS only produces a link to a subscriber station when a message exchange is supposed to take place between the two. When the message exchange has ended, the antenna of central station ZS disconnects the link again.

The information as to for which subscriber stations links are to be established and disconnected can be exchanged via a signaling channel between the subscriber stations and the central station. For such a signaling channel, it is expedient if an antenna of the central station provided for this purpose produces an omnidirectional characteristic which covers all subscriber stations TS1 . . . TS6 simultaneously.

Figure 2:
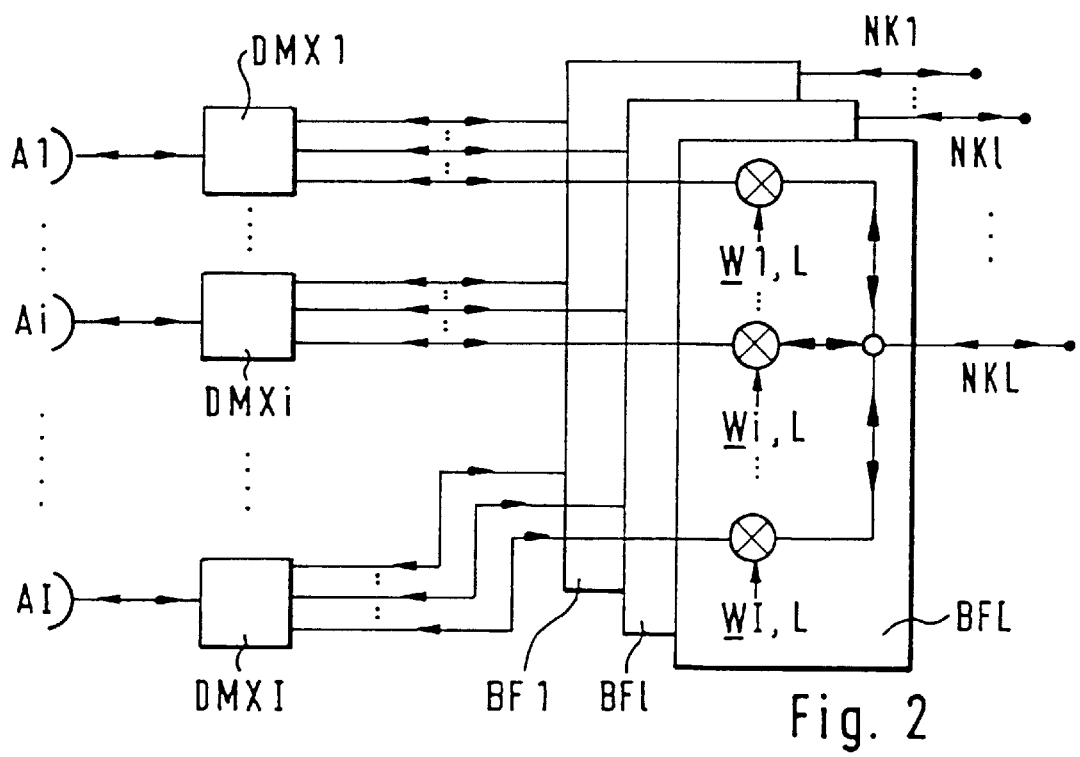
FIG. 2 shows an overview diagram of a beam-forming network for the antenna of the central station.

Communications can be transmitted in the same physical channel, i.e. on the same frequency, in the same time slot or in the same code, via lobes which are spatially separate from one another. To produce the lobe-shaped characteristic previously described, it is advantageous to use an adaptive array antenna. As shown in FIG. 2, such an array antenna is comprised of a plurality of antenna elements A1, . . . Ai, . . . AI. These antenna elements A1 . . . AI are so distributed that, given appropriate control via beam-forming networks BF1, . . . , BFl . . . , BFL, they produce any radiation lobe desired with regard to direction and opening angle or beam angle. For each of the L communication channels NK1, . . . , Nkl . . . , NKL present, a beam-forming network BF1 . . . , Bfl . . . , Bfl . . . , BL is present. The two arrow directions drawn in the circuit arrangement of FIG. 2 indicate that both transmission lobes and reception lobes can be produced with the circuit arrangement. In the transmission case, a multiplexer, and in the reception case, a demultiplexer is switched between each individual antenna element A1 . . . AI and beam-forming networks BF1 . . . BFL. In FIG. 2, multiplexers and demultiplexers are designated with the shared reference numerals DMX1, . . . , DMXi . . . , DMXI. If, for example, a communication channel NKL is supposed to be emitted with a lobe completely predetermined with regard to direction and opening angle, then this channel NKL is split up in beam-forming network BFL into as many individual signals as there are antenna elements A1 . . . AI for producing the appertaining transmission lobe. Each of these individual signals is multiplied by a weighting factor w1L, . . ., wiL . . ., wIL. These weighting factors are filed as vectors in a separate memory device and are so calculated that, in their sum, the signals weighted by them and supplied to the individual antenna elements A1 . . . AI form the desired transmission lobe. Multiplexers DMX1 . . . DMXI, connected in series to antenna elements A1 . . . AI, combine the weighted signals of all communication channels NK1 . . . NKL determined for the respective antenna element A1 . . . AI. The type of multiplexer DMX1 . . . DMXI depends on whether the radio relay system is used in frequency division multiple access (FDMA), time division multiple access (TDMA) or code division multiple access (CDMA) operation. In the reception case, the partial signals received from the individual antenna elements A1 . . . AI are combined in reverse direction, appropriately weighted, and from that the received communication channels NK1 . . . NKL are derived.

If, as already previously described, individual channels are repeatedly utilized, i.e. messages are transmitted in the same channel via lobes which are locally separate from one another, then it is necessary to take this circumstance into account in the weighting of the individual communication channels.

The sector and lobe partitioning can be the same for the transmission direction and for the reception direction. However, they can also be different for both directions, depending on what has the more favorable effect on the signal-transmission quality.

The transmitters and receivers can be so designed that they are switchable to various types of modulation (e.g. n-PSK, n-QPSK, where n=1,2, . . . or M-QAM where M=4 . . . 256), so that data transmissions are possible with subscriber-individual band widths. It is also useful to be able to adjust the transmitting powers in a subscriber-individual manner.

What is claimed is:

1. An antenna unit of a central station of a point-to-multipoint radio relay system, the antenna unit defining a predetermined plurality of fixed sectors emanating radially therefrom, a first portion of the sectors being transmissions sectors and a second portion of the sectors being non-transmission sectors, each of the sectors being restricted to a predetermined area as a function of a respective direction and a respective opening angle thereof, wherein the direction and opening angle of each of the transmission sectors is defined based on a location of one or more of a plurality of fixed subscriber stations, each of the non-transmission sectors including no subscriber stations therein.

2. The antenna unit according to claim 1, wherein signals generated in a first one of the transmission sectors are polarized orthogonally relative to signals generated in an adjacent one of the transmission sectors.

3. The antenna unit according to claim 1, wherein at least one of the transmission sectors defines a transmission lobe therein.

4. The antenna unit according to claim 3, wherein the transmission lobe includes at least two of the plurality of subscriber stations therein.

5. The antenna unit according to claim 1, wherein at least one of the transmission sectors defines a plurality of transmission lobes therein.

6. The antenna unit according to claim 5, wherein, when a first transmission link exists between a first one of the plurality of subscriber stations and the central station, a corresponding one of the transmission lobes encompasses the corresponding first subscriber station, and wherein the corresponding transmission lobe is disestablished when the first communication link is terminated.

7. The antenna unit according to claim 5, wherein the arrangement communicates with at least two of the plurality of subscriber stations using an identical channel, and wherein the at least two subscriber stations are located in transmission lobes being separated from one another.

8. The antenna unit according to claim 7, wherein the at least two subscriber stations have one of an identical frequency, an identical time slot, and an identical code.

9. The antenna unit according to claim 1, wherein the antenna unit includes a plurality of antenna elements controlled using beam-forming networks.

10. The antenna unit according to claim 9, wherein each of the antenna elements is connected to one of the beam-forming networks using one of multiplexers and demultiplexers.

11. The antenna unit according to claim 1, wherein a signaling channel is transmitted between the subscriber stations and the central station omnidirectionally.

12. The antenna unit according to claim 11, wherein the signaling channel contains information relating to creating and removing transmission lobes within the transmission sectors.

13. The antenna unit according to claim 5, wherein a respective one of a plurality of modulation types is selected for each of at least two of the transmission lobes.

\* \* \* \* \*